US010936370B2

(12) United States Patent
Artico

(10) Patent No.: US 10,936,370 B2
(45) Date of Patent: Mar. 2, 2021

(54) APPARATUS THAT GENERATES OPTIMAL LAUNCH CONFIGURATIONS

(71) Applicant: International Business Machines Corporation, Armonk, NY (US)

(72) Inventor: Fausto Artico, Stevenage (GB)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 16/175,970

(22) Filed: Oct. 31, 2018

(65) Prior Publication Data

US 2020/0133734 A1  Apr. 30, 2020

(51) Int. Cl.
*G06F 9/46* (2006.01)
*G06F 9/50* (2006.01)
*G06F 9/48* (2006.01)
*G06F 9/445* (2018.01)

(52) U.S. Cl.
CPC ........ *G06F 9/5044* (2013.01); *G06F 9/44505* (2013.01); *G06F 9/4881* (2013.01); *G06F 9/50* (2013.01); *G06F 9/5011* (2013.01); *G06F 9/5016* (2013.01); *G06F 9/5027* (2013.01)

(58) Field of Classification Search
CPC ...... G06F 9/4881; G06F 9/5044; G06F 9/455; G06F 9/30174; G06F 3/0665; G06F 9/5027; G06F 9/50; G06F 9/5011; G06T 1/20; H04L 43/08
See application file for complete search history.

(56) References Cited

U.S. PATENT DOCUMENTS

| 7,414,428 | B2 | 8/2008 | Speers |
| 8,225,074 | B2 | 7/2012 | Chakradhar et al. |
| 8,302,098 | B2 | 10/2012 | Johnson et al. |
| 9,292,350 | B1 * | 3/2016 | Pendharkar ........... G06F 9/5044 |
| 10,176,550 | B1 * | 1/2019 | Baggerman ............... G06T 1/20 |
| 2005/0231514 | A1 | 10/2005 | Harper et al. |

(Continued)

OTHER PUBLICATIONS

Tillmann, M., et al., "Application-independent Autotuning for GPUs", Advances in Parallel Computing, Sep. 2013, 10 pages, vol. 25.

(Continued)

*Primary Examiner* — Tuan A Vu
(74) *Attorney, Agent, or Firm* — Scully, Scott, Murphy & Presser, P.C.; Daniel P. Morris

(57) ABSTRACT

Launch configurations of a hardware acceleration device are determined, which minimize hardware thread management overhead in running a program code. Based on received hardware behaviors, the architectural features, the thread resources and the constraints associated with the hardware acceleration device, possible launch configurations and impossible launch configurations are generated. A ranking of at least some of the possible launch configurations may be generated and output, based on how well each of said at least some of the possible launch configurations satisfies at least some of the constraints. Parametric values of said at least some of the possible launch configurations, an explanation why the impossible launch configurations have been determined as being impossible, and one or more strategies for scheduling, latencies and efficiencies associated with the hardware acceleration device, are output.

20 Claims, 5 Drawing Sheets

(56) References Cited

U.S. PATENT DOCUMENTS

| | | | |
|---|---|---|---|
| 2006/0080076 A1 | 4/2006 | Lahiri et al. | |
| 2009/0322764 A1 | 12/2009 | Saini et al. | |
| 2010/0082851 A1* | 4/2010 | Green | G06F 9/4881 710/29 |
| 2011/0078226 A1 | 3/2011 | Baskaran et al. | |
| 2012/0079298 A1 | 3/2012 | Majumdar et al. | |
| 2012/0154389 A1* | 6/2012 | Bohan | G06F 9/5044 345/419 |
| 2013/0057560 A1* | 3/2013 | Chakraborty | G06F 9/455 345/520 |
| 2013/0074077 A1 | 3/2013 | Miller et al. | |
| 2013/0219377 A1 | 8/2013 | Glaister et al. | |
| 2014/0025893 A1* | 1/2014 | Brown | G06F 9/30174 711/125 |
| 2014/0359213 A1* | 12/2014 | Messec | G06F 3/0665 711/114 |
| 2014/0380025 A1 | 12/2014 | Kruglick | |
| 2016/0085587 A1 | 3/2016 | Dube et al. | |
| 2016/0321113 A1 | 11/2016 | Pinto et al. | |
| 2018/0150298 A1* | 5/2018 | Balle | H04L 43/08 |

OTHER PUBLICATIONS

Grauer-Gray, S., et al., "Auto-tuning a High-Level Language Targeted to GPU Codes", Innovative Parallel Computing, May 2012, 10 pages.

Angelopoulos, C., "Automatic Generation of FFT Libraries for GPU Platforms", Submitted in partial fulfillment of the requirements for the degree of Master of Science in Electrical and Computer Engineering, Carnegie Mellon University, Aug. 2012, 40 pages.

Mametjanov, A., et al., "Autotuning Stencil-Based Computations on GPUs", Proceedings of the IEEE International Conference on Cluster Computing, Sep. 2012, 9 pages.

Li, A., et al., "Critical Points Base Register-Concurrency Autotuning for GPUs", 19th Design, Automation and Test in Europe Conference and Exhibition (DATE 2016), Apr. 2016, 6 pages.

Holm, M., et al., "Dynamic Autotuning of Adaptive Fast Multipole Methods on Hybrid Multicore CPU & GPU Systems", Mar. 17, 2014, 26 pages.

Chen, G., ,et al., "Free Launch: Optimizing GPU Dynamic Kernel Launches through Thread Reuse", MICRO 2015, Dec. 2015, 13 pages.

Weber, N., et al., "Guided Profiling for Auto-Tuning Array Layouts on GPUs", PMBS2015, Nov. 15-20, 2015, 11 pages.

Bergstra, J., et al., "Machine Learning for Predictive Auto-Tuning with Boosted Regression Trees", Innovative Parallel Computing, May 2012, 9 pages.

Vollmer, M., et al., "Meta-programming and Auto-tuning in the Search for High Performance GPU Code", FHPC' 15, Sep. 3, 2015, 1-11 pages.

Guerreiro, J., et al., "Multi-Kernel Auto-Tuning on GPUs: Performance and Energy-Aware Optimization", 2015 23rd Euromicro International Conference on Parallel, Distributed, and Network-Based Processing, Mar. 2015, pp. 438-445.

Davidson, A., et al., "Toward Techniques for Auto-tuning GPU Algorithms", International Workshop on Applied Parallel Computing, PARA 2010: Applied Parallel and Scientific Computing, Jun. 2010, 2012, Springer-Verlag Berlin Heidelberg, pp. 110-119, Part II, LNCS vol. 7134.

Wang, Z., et al., "Yet another Hybrid Strategy for Auto-tuning SpMV on GPUs", International Journal of Software Engineering and Its Applications, 2015, http://www.sersc.org/journals/IJSEIA/vol9_no5_2015/10.pdf, Accessed on Oct. 30, 2018, pp. 97-106, vol. 9, No. 5.

Rapp J. et al., "Dynamically Configured Hardware Accelerator Functions," IP.com No. IPCOM000171311D, Feb. 1, 2008, Electronic Publication Date Jun. 4, 2008, 27 pages.

Pujari, R.K., et al., "A Hardware-based Multi-objective Thread Mapper for Tiled Manycore Architectures," 2015 33rd IEEE International Conference on Computer Design (ICCD), Oct. 18, 2015, pp. 459-462.

The Editors of Encyclopaedia Britannica, "Transcendental function", https://www.britannica.com/science/transcendental-function, Accessed on Oct. 31, 2018, 1 page.

\* cited by examiner

APPARATUS THAT GENERATES OPTIMAL LAUNCH CONFIGURATIONS

BACKGROUND

The present disclosure relates generally to integrated circuits and particularly to processor devices and configuring of processor devices.

Computer devices or processors such hardware acceleration devices or hardware accelerators such as a graphics processing unit (GPU), a field programmable gate array (FPGA), or a microprocessor having a combination of central processing units (CPUs) and hardware acceleration devices, or another like device, have complex architectures. It is not easy to determine high performing launch configurations of such devices, and often a chosen launch configuration can cause codes to perform inefficiently. Moreover, some launch configurations are not possible to run, but one discovers such impracticality only after a code is implemented to run on a hardware accelerator.

The number of possible launch configurations to run an accelerator kernel can be high and it becomes infeasible for a programmer to explore all the possible launch configurations. The difficulty of choosing a well-performing launch configuration can be compounded also because hardware accelerators have complex architectures and many of their architectural features and hardware behaviors are not readily known. While launch configurations that are logically easy to implement and that do not take into account many of the accelerator architectural features and hardware behaviors can be chosen, such launch configurations often generate low code efficiency.

BRIEF SUMMARY

A computer-implemented apparatus and method of determining launch configurations of a hardware acceleration device which minimize hardware thread management overhead in running a program code may be provided. The method, in one aspect, may include receiving as input hardware behaviors associated with the hardware acceleration device, architectural features associated with the hardware acceleration device, thread resources associated with the hardware acceleration device, constraints associated with the hardware acceleration device, the constraints comprising hard constraints which if not satisfied, the hardware acceleration device would not run, and soft constraints which even if not satisfied, the hardware acceleration device would run. The method may further include, based on the hardware behaviors, the architectural features, the thread resources and the constraints, generating possible launch configurations and impossible launch configurations, the impossible launch configurations comprising launch configurations not satisfying the hard constraints, and the possible configurations comprising launch configurations satisfying the hard constraints. The method may also include outputting a ranking of at least some of the possible launch configurations based on how well each of said at least some of the possible launch configurations satisfies the soft constraints. The method may further include outputting parametric values of said at least some of the possible launch configurations. The method may also include outputting an explanation of why the impossible launch configurations have been determined as being impossible. The method may also include outputting a strategy for scheduling, latencies and efficiencies of said at least some of the possible launch configurations.

An apparatus, in one aspect, may include a hardware processor and a memory couple with the hardware processor. The hardware processor may be operable to receive as input hardware behaviors associated with a hardware acceleration device, architectural features associated with the hardware acceleration device, thread resources associated with the hardware acceleration device, constraints associated with the hardware acceleration device. The constraints may include hard constraints, which if not satisfied, the hardware acceleration device would not run. The constraints may also include soft constraints, which even if not satisfied, the hardware acceleration device would run. Based on the hardware behaviors, the architectural features, the thread resources and the constraints, the hardware processor may be operable to generate possible launch configurations and impossible launch configurations associated with the hardware acceleration device in running a program code. The impossible launch configurations may include launch configurations not satisfying the hard constraints. The possible configurations may include launch configurations satisfying the hard constraints. The hardware processor may be operable to output a ranking of at least some of the possible launch configurations based on how well each of said at least some of the possible launch configurations satisfies the soft constraints. The hardware processor may be operable to output parametric values of said at least some of the possible launch configurations. The hardware processor may be further operable to output an explanation why the impossible launch configurations have been determined as being impossible. The hardware processor may be further operable to output a strategy for scheduling, latencies and efficiencies of said at least some of the possible launch configurations.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
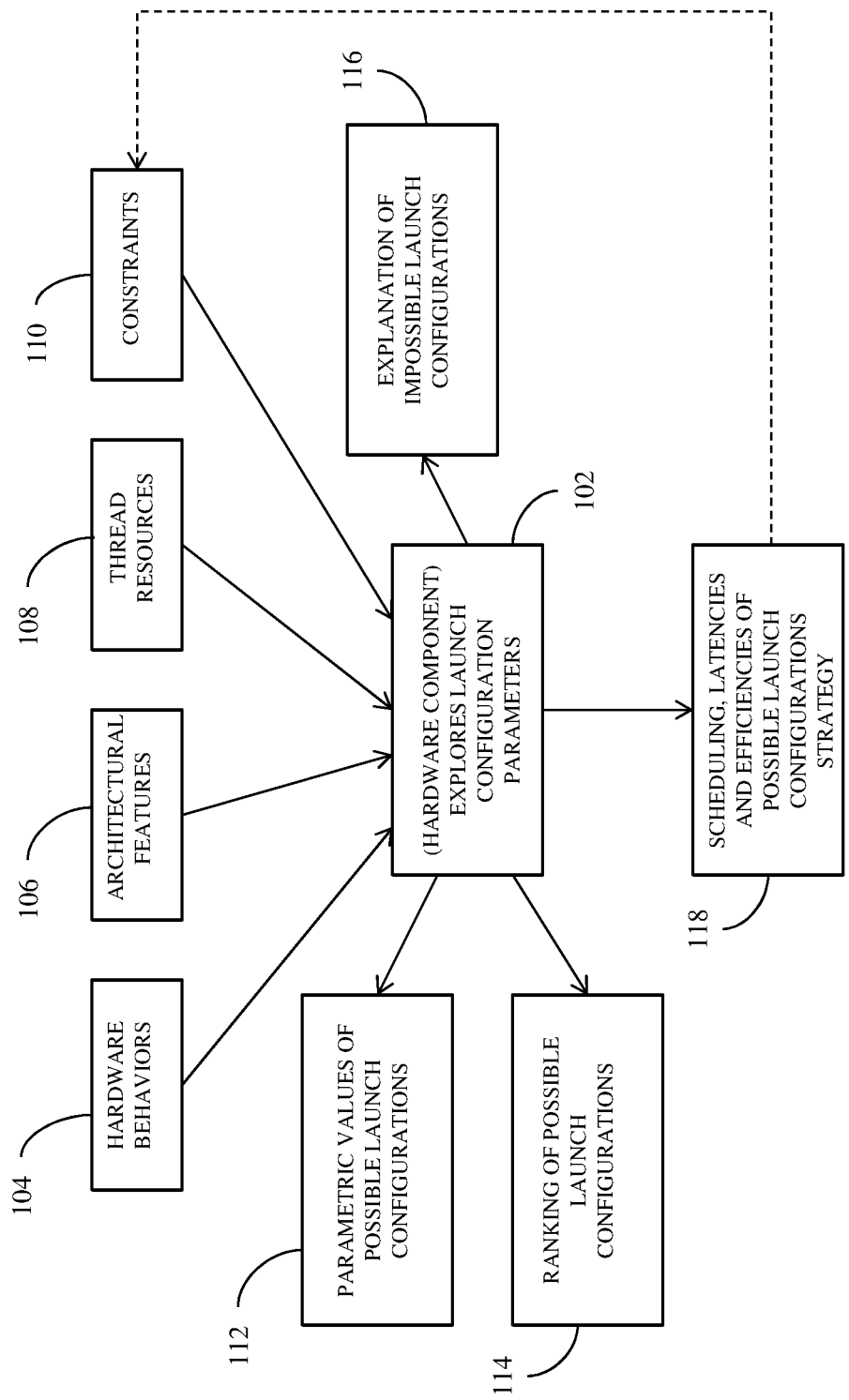
FIG. 1 is a diagram illustrating an embodiment of an apparatus that generates launch configurations in one embodiment.

A launch configuration can be considered as what is necessary to run a kernel or one of its subsets (e.g., number of blocks, number of threads per block, number of hardware registers per thread, shared memory to allocate to each block, and/or others).

Examples of an accelerator may include, but not limited to, a graphics processor unit (GPU), an accelerator processing unit, and a field programmable gate array (FPGA). Another example is a tensor processing unit (TPU).

Thread management refers to hardware actions performed in relation to threads, for example, but not limited to, allocating and de-allocating threads and the hardware resources needed for the execution of those threads, scheduling the threads on the hardware resources, executing spill loads and stores for the registers, and executing swaps, suspensions and restarts for the threads.

An apparatus, system, method and techniques (also collectively referred to as a methodology for simplicity of explanation only) are disclosed, which configure or determine launch configurations that allow accelerators to run efficiently, for example, generate "optimal launch configurations," which generates smaller hardware overhead for thread management. In this respect, the methodology in some embodiments generates launch configurations, which minimize the total overhead related to the management of the threads. The methodology of the present disclosure may leverage available parameters of the accelerator architectures and discover hardware limitations by running microbenchmark codes, to a priori choose the hardware resources necessary per thread. In some aspects, the "optimal launch configurations" of the present disclosure may provide for minimum hardware overhead due to thread management, increase performance for the code runs, provide insight on how to better design more performing codes and allow for faster code prototyping and implementation phases.

In the present disclosure in some embodiments, the architectural features and the hardware behaviors of accelerators are considered, for example, using combinatorics, to generate in a parametric way the launch configurations that generate the minimum hardware overhead for thread management and therefore potentially generate the high code efficiency and speed-ups.

In some aspects, unlike some existing auto-tuning techniques, the methodology in the present disclosure 1) need not run the code; 2) need not consider memory access patterns; and 3) need not optimize data locality reuse. The methodology of the present disclosure can produce launch configurations that minimize the hardware overhead caused by the management of the threads and may generate code design strategies.

Accelerators have complex architecture. Take as an example of an accelerator, a graphics processing unit (GPU). Different graphics processing units (GPUs) can have different architectures. In general, different architectures may have different numbers of processors, random access memory (RAM) capabilities, speed for the interconnecting link between GPU global memory and on-chip components. For instance, a known GPU has a modular architecture, which includes a number of blocks or processors. For instance, NVIDIA's GPU has blocks called streaming multiprocessors (SMs) where computations occur. Each block can have components such as schedulers, instruction dispatch units, cores, load/store units, L1 cache and shared memory. A GPU can also have an L2 cache and GigaThread Scheduler and/or other components. For instance, an NVIDIA GPU (from Nvidia Corporation, Santa Clara, Calif.) can have 2-level schedulers, reporting to the GigaThread Scheduler, scheduling blocks of 32 threads each (blocks can be composed by one or more warps), two groups of functional units, which may include groups of cores (e.g., compute unified device architecture (CUDA) cores), a group of load/store units and a group of special function units. Those groups, for example, receive threads from the Warp Schedulers, move data from and to a register file, and leverage other memory resources available in the SM (e.g., shared memory, texture memory, L1 cache), and share other hardware resources with the other SMs (e.g., L2 cache, read-only cache and part of an interconnect network).

Organizing threads in number of blocks and inside each block is complex and the number of possibilities is large, in which some combinations work better than others on different architectural families and even inside the same architecture. Different types of memories need to be leveraged during execution and the permission access of the threads that reside on a processor of a GPU (or another accelerator) need to be managed. GPU threads can be assigned to processors at the beginning of the computation. In some GPU architectures, such threads cannot migrate across other processors of the GPU, while in other GPU architectures, such threads can be pre-empted, register files saved, and the threads can resume computation on the same or different processors. In the latter scenario, the GPU can incur overhead, for instance, due to data migration, stop and restart processing.

Launch configurations may be considered as grids of blocks, which need to be organized. GPU hardware schedules blocks (e.g., warps that compose the blocks). For instance, when a program or code executes, the number of threads needed to execute the program and organize the threads in blocks are decided. As an example, consider the following example architectural model. Each block should have the same number of threads and a 2D grid of blocks created with the blocks, for example, 10×3 blocks for a total of 30 blocks. Inside each block and across blocks, the threads need to be organized in the same structure, for example, a 3D block of 12×30×2 threads for a total of 720 threads per block. Multiple programs running at the same time on the same GPU further complicates allocation of threads and blocks. Each block is assigned to only 1 processor (e.g., SM) during the computation. Blocks can get be suspended and restarted on another processor (e.g., SM) but all the threads of a block are able to use only the hardware resources of the processor (e.g., SM) to which they are assigned. Threads of a block compete for resources with threads of other blocks of the same or different program (blocks of other programs can be assigned to the processor (e.g., SM) where the block of the instant program is running). Blocks of the same program are usually distributed to several processors (SMs) to try to accomplish workload balancing on the resources of the GPU. Threads on different processors (SMs) cannot talk with each other directly but data needs to flow from a processor (e.g., SM), to L2 cache or lower (e.g., global memory) memory, and flow up again to reach the processor (e.g., SM) where the requiring thread resides. Each thread has its registers in a register file, at least some of which cannot be used to communicate with other threads, for example, to exchange data. All those factors make it complex to determine the best launch configuration to execute a code. A launch configuration thus, may be considered as a combination of the number and layout (e.g., 2D layer) of the blocks and the number and organization of the threads inside each block.

Given the above complexities in running an accelerator, the methodology of the present disclosure in embodiments generates launch configurations to execute a code on an accelerator and which launch configurations minimize the time lost from the hardware perspective in managing the threads. In one aspect, choosing a resource allocation to minimize the hardware time and lost performance incurred by inaccurately determining the organization of the blocks and the threads, is a different and distinctive problem from determining the launch configuration to speed up code execution.

For example, by increasing the number of warps that reside in an SM, the probability of hiding data latency may be increased; however, at the same time, the Warp Schedulers need to perform more work. Managing bottlenecks which may occur and the time lost in managing the threads in the SMs may offset the benefit gained from the ability to hide data latency. For instance, having more threads residing on the same SM increases the probability of conflicts occurring across threads for the use of the resources, and therefore implies a more complex coordination among the threads. The hardware would need to spend time in policing the threads to make sure that data hazard and other negative phenomena are avoided and so that computation is executed in the correct way.

As another example, in some architectures, due to the fact that because the warps are scheduled on a group of functional units (e.g., 2 groups of 16 CUDA cores, a group with 16 load/store units, and a group of Special Function Units) and considering that the functional units execute different operations, the instruction mix that compose a program has an effect on how many threads should be used for its execution, to minimize conflict resolution for the use of the resources.

Accelerator architectures can be modular. For example, some can have a greater number of groups of CUDA cores and/or a different number of CUDA cores per group. The methodology of the present disclosure can generalize any architecture, for instance, by creating a parametric model for it (e.g., number of SMs, size and number of different types of memories and group of functional units, way of interfacing between different hardware components, and/or others).

In some embodiments, the methodology of the present disclosure considers architectural information of accelerators, and also may run of micro-kernels to generate curves for the effects to determine launch configurations, which may be selected to run a program. Such launch configurations minimize the time lost in thread management by the schedulers. The more the time is lost, the lower the probability that there are threads always running at any moment, and therefore the lower the probability of using all the available hardware resources and minimizing the total running time of the program. While determining launch configurations that minimize the total overhead related to the management of the threads of the present disclosure is different from the problem of speeding up execution, such launch configurations can also have a positive effect in execution speed and take into consideration minimizing of the total run time of the program, application, or code.

FIG. 1 is a diagram illustrating an embodiment of an apparatus that generates launch configurations in one embodiment. A hardware component 102 such as a processor receives input, which may include hardware behaviors 104, architectural features 106, thread resources 108 and constraints 110. Hardware behaviors 104, architectural features 106, thread resources 108 provide information about a target hardware or accelerator whose launch configuration is being generated or optimized. Constraints 110 may include a high level source code or a specific number and type of instructions to execute with specific dependencies, the number of times the thread can run, and/or other constraints which are not captured in the hardware behaviors 104 and the architectural features 106.

The hardware component 102 may implement combinatorics and pruning of the research space, to generate only the possible launch configurations, in one embodiment, providing values of the parameters associated with the possible launch configurations 112. The hardware component 102 may also rank the possible launch configurations and provide the rankings 114. The hardware component 102 may further provide explanations describing one or more reasons some configurations are not possible to execute on a target accelerator 116, and provide strategies about scheduling, latencies and efficiencies of each launch configuration 118.

Examples of a hardware behavior 104 may include, but are not limited to, how the blocks are distributed to multiprocessors of an accelerator, for example, streaming multiprocessors (SMs) of a GPU; how the threads are scheduled; the cache policies; and/or others. A hardware behavior 104 generally refers information generated or obtained from running micro-kernels, for instance, representing the real code. Micro-kernels may include synthetic kernels that can be generated to represent parts of a program that consume quantities of run time. Running them, if needed, the hardware component 102 can discover information such as the maximum number of allowed warps per block by the architecture, information which may be difficult to discover with only architectural details.

Examples of architectural features 106 may include, but are not limited to, the number of processor in an accelerator, for example, streaming multiprocessors (SMs) of a GPU; the number of hardware registers per processor (e.g., per SM); the quantity of shared memory per processor (e.g., per SM); the clock frequencies of the global memory and the processors (e.g., SMs), and/or others. The architectural features are generally the models for the machine (e.g., number of SMs, number of registers, size of the shared memories, number and types of groups of functional units in the SMs).

Example of thread resources 108 may include, but are not limited to, the quantity of shared memory used by each block; the number of threads per block; the number of hardware registers per block; and/or others. Generally, thread resources 108 are related to threads as logical concept, for example, to blocks which are composed by threads, to warps, and thread and block organization.

Examples of constraints 110 may include, but are not limited to, the maximum number of threads per block; how many warps each processor (e.g., SM) can have on-the-fly; the maximum number of hardware registers that can be assigned to a thread; and/or others. Constraints 110 may include one or more rules and/or ways of how the different hardware components should interact. For example, constraints 110 may specify how data should flow and how data can be exchanged between components; that threads cannot use registers to exchange data; how many blocks can be assigned to a processor (e.g., SM); the maximum number of warps each block can have regardless of how threads are organized inside a block or the number of registers that threads need.

The hardware component 102 outputs a ranking of possible launch configurations 114. This ranking is a list that represents a score of each possible launch configuration and values of their parameters 112. Another output of the hardware component 102 may include an explanation of impossible launch configurations, for instance, so that the input parameters may be modified to explore different optimization spaces. The hardware component 102 may also output strategies or advices about scheduling, latencies and efficiencies 118, for example, which can drive code design and reduce the time necessary for code prototyping and implementation phases.

In some embodiments, examples of the parametric values 112 may include, but are not limited to: configuration of the 2-dimensional (2D) grid of blocks, number of threads per block and their 3-dimensional (3D) configuration, number of registers to assign to each thread. Other examples of the parametric values 112 may include, but are not limited to: number of blocks to assign to each processor of an accelerator (e.g., SM), quantity of a processor (e.g., SM), shared memory assigned to each block, quantity of read-only constant memory used, and/or others.

In some embodiments, the ranking of possible launch configurations 114 are generated based on considering factors such as how many constraints are satisfied and penalized according to associated weights, parametric architectural models and experimental runs on the micro-kernels.

The explanations about the impossible launch configurations 116 can educate a user, programmer or the like (e.g., an automated programming tool), on why some launch configurations are impossible so as to make the functioning of the target device (machine or apparatus) more transparent to the programmer, for instance, instead of seeing it entirely as a black box. For instance, the explanations 116 can provide the programmer information associated with at least some of the aspects of the workflow, while maintaining other (e.g., more complex) information hidden, which may be handled by the methodology of the present disclosure (e.g., number of details and relationship between the details can be handled by the methodology of the present disclosure, e.g., leveraging the parametric machine models an using experimental runs of a micro-kernel) so as to not burden the programmer with overload of complex detailed information.

In some embodiments, advice about the scheduling, latencies and efficiencies for the possible launch configurations 118 can be useful to allow to a user to make choices and if necessary to modify the weights used to rank the launch configurations, inserting them as new constraints. For instance, a feedback mechanism may be implemented that allows for an interactive procedure between a programmer and an apparatus implementing the methodology of the present disclosure. In some aspects, the apparatus may control or drive the programming of a target device based on the one or more strategies 118 and the ranking of possible launch configurations 114. For instance, the apparatus may disallow coding of the target device which includes parameters, which are not recommended by the apparatus. For example, while the apparatus may allow for the user to modify parametric values or rankings, the apparatus may disallow modifications that are outside of one or more rules established by the apparatus.

As an example, the apparatus may request the programmer for penalization weights in the case the average number of instructions per clock cycle does not increase quickly enough after a discovered optimal point. The apparatus may discover the optimal point and make it a starting point for an interaction with the programmer, making sure that the programmer cannot chose a smaller number of warps per block than the one associated with the optimal point, and not allowing the programmer to choose negative penalization weights for a number of warps greater than the one associated with the optimal point. In this way the programmer would not be able to remove the choice made by the apparatus, because any solution with a greater number of warps would be penalized considering that the weights have to be positive, while the programmer can still have some control with respect to other launch configurations which may be given a lower ranking compared to the launch configuration in consideration.

As another example, the interactive aspect of the apparatus may prevent a programmer or the like from changing linear and/or non-linear formulas used in generating the ranking of possible launch configurations 114. The methodology of the present disclosure may also allow for considering one or more of a deep knowledge of the architectural models, the constraints among different parts of the architectural models, and experimental launches of micro-kernels. For instance, the apparatus can better handle billions of instructions per second and determine consequences and effects fast and in a reliable way considering the domain knowledge base integrated in the models and the constraints, fine tuning the formulas with experimental runs of the micro-kernels, for instance, as needed.

The hardware component 102 in some embodiments generates the launch configurations 112, 114, adds constraints 110 inserting new constraints that can be inferred, for example, based on the generated strategy 118, and starts to verify which constraints are satisfied and which are not, whether the constraints are hard or soft constrains. If a hard constraint is not satisfied then the launch configuration is put in a list of impossible launch configurations (ILCs). If a soft constraint is not satisfied then the apparatus follows a set of rules such as calculating or applying a penalty if the penalty can be determined using the parametric models. The penalty in some embodiments can be fined tuned by running micro-kernels, gathering information from the hardware, and optionally interacting with the user or programmer or the like. The hardware component 102 outputs the list of launch configurations in the ILC, with explanations 116, the list of launch configurations in possible launch configurations (PLCs) with ranking 114 and a list of advice about scheduling, latency and performance 118 that can be used by the user to update the weights for choices, and inserts them back as part of the constraints 110, updating the constraints input 110.

The hardware component 102, in some embodiments considers architectural organization of a target device (e.g., accelerator such as a GPU) on which a program is to be run. In some embodiments, the hardware component 102 also runs one or more micro-kernels to discover an overhead management curve for a particular code format, which can resemble the program to be run. For instance, consider a GPU architecture with multiple processors (e.g., SMs), each SM has 2 Warp Schedulers, 2 instruction dispatch units, 2 groups of 16 CUDA cores, 1 group of 16 load/store units, 1 group of 4 special units, and 64 kilobyte (KB) RAM (L1+shared memory). If it is given that there are 2 groups of 16 CUDA cores in each SM, then users, programmers or the like should not create blocks with 33 threads because that implies that each block would have 2 warps, a first warp with 32 threads and a second warp with only 1 thread instead of 32. Further, such configuration would imply that because each warp has to be scheduled on 1 group of CUDA cores, the first would utilize all the available 16 CUDA cores of that group while the second will lock the 2 group of 16 CUDA cores using only 1 of them and not allowing any other warp to use the remaining 15 of the group. Such configuration also implies waste of resources every time the second warp is assigned to the second group of CUDA cores for the execution of an instruction. In fact, if, for example, for each single instruction program, the warps need to be assigned to one of the 2 groups of CUDA cores then such waste would happen every time. Furthermore, there also may be interleaving among the warps because, for example, computations executed by warps may be useful for other warps to allow those other warps to be able to continue with the execution of their part of the program.

In some embodiments, the hardware component 102 also considers different types of resources such as the number of blocks to use to execute a program. A number of blocks to use for the execution of a program may depend on many factors, which may include the number of processors such as the number of SMs. The hardware component 102 may generate launch configurations that minimize problems related to block assignment to the SMs and thread execution inside the SMs. For instance, architectural insight allows for selecting a group of launch configuration across the billions that are possible and micro-kernels allow for refining non-linear curves related to possible overhead. For a simple architecture as an example, the number of possible grid block configurations can be approximately $2^{31} \times 2^{31}$ and the number of ways to organize threads inside each block can be 1024×1024×1024. This number of possibilities can be greatly increased for different architectures. The hardware component 102 may rule out impossible launch configurations and for the remaining possible launch configurations, perform a search for the "optimal" launch configurations in an automatic way.

In some embodiments, the hardware component 102, to drive the search and present the best launch configurations, may leverage not only parametric models (e.g., number of SMs, number of registers per SM, number of Warp Schedulers per SM, size of the L1 cache, number and types of functional units in each SM), but also how the different hardware components can interact with other (e.g., threads cannot use each other's registers, threads cannot migrate across warps during the executions, threads cannot directly communicate with other threads that reside in other SMs, and/or others).

As an example, consider the following scenario. A number of SMs in one example processor architecture is only 2. Consider that 1 SM has a number of registers <X*Y. A launch configuration with 1 block and a number X of threads, each one using Y registers, for a total of X*Y registers, would be considered as an impossible launch configuration and the GPU would not execute on such launch configuration. The program would not run, because the GPU does not distribute the threads across the 2 SMs. For instance, the hardware does not split blocks and each block can be assigned to only 1 SM.

The hardware component 102 may generate and present launch configurations that are possible and rank them in order of importance considering the architectural parameter of the GPU, considering graphs of inter-relationship between components and rules or formulas coded to determine the effect of choices compared to others. For example, the number of registers to use per thread and/or the quantity of shared memory to use per thread may determine the number of threads that can reside in a SM.

Other considerations can be used to determine how many blocks can be composed by these threads (e.g., 1 with T threads, or 2 with T/2 threads) and how the threads should be organized in each block. For example, whether a number of threads different from 32*A per block is a good choice or not may be determined based on factors such as the type of instruction mix (e.g., only summation instructions or also other instructions) and how many functional units per group of functional units the architecture has. If the code has only transcendental instructions (e.g., sin, cos, log instructions) and few load/store instructions, and the Special Function Unit group has 4 Special Function Units then numbers of threads per block that are multiple of 4 may be considered to be a good choice. Additional constraints may also be considered, for example, the fact that each SM cannot have more than B blocks residing at every time in it, regardless of whether the blocks only use few threads and few registers per thread. Not considering all possible factors may generate very poor performance during code execution.

The hardware component 102 may consider the above architectural constraints, and may also allow a user to add rules. Using the architectural constraints and rules, the hardware component 102 may generate all the launch configurations. The hardware component 102 may discard launch configurations which are considered not possible (for example, configuration that require resources that the GPU does not have the capability of providing). For the remaining launch configurations, the hardware component 102 can create a ranking of the configurations using different types of penalty weights. Launch configurations that generate a launch on the GPU or accelerator are called possible launch configurations (PLCs), for instance, because a GigaThread Scheduler can execute them. Those launch configurations may be given weights based on how well each launch configuration satisfy all the constraints. As an example, constraints can be hard (hard constraints are used to distinguish between possible and impossible launch configurations (ILCs), or in other words between launch configuration that could be used to execute a code and launch configurations that are impossible for the GPU to use to execute the code). Constraints can be soft. A soft constraint that is not satisfied can generate a penalty, but the GPU would be able to execute the code even if a launch configuration that does not satisfy one or more soft constraints is used. Among the possible launch configurations that can be used to execute a code, some can satisfy all the constraints, PLC_T1, and some can satisfy only a subset of all the constraints, PLC_T2, where T represents a type of a possible launch configuration. In some embodiments, each type of unsatisfied constraint can have a different penalty weight, for instance, based on their importance compared to others. For instance, it is not always true that a launch configuration PLC_T2 that does not satisfy 3 constraints would generate a final score lower than a PLC_T2 that does not satisfy only 1 constraint. For example, from the point of view of the overhead for the management of the threads, it could be better to not use all the hardware resources of the SM if that would imply a large amount of conflict among threads for the use of the same functional unit groups. Threads of the same block and/or program may need the use of different functional unit groups depending on the instruction mixes that those threads need to execute, and the mixes may be different for subsets of threads, warps and blocks.

The penalty weight for each unsatisfied constraint can be determined considering the architecture and also running micro-kernels to discover non-linear effects. An example related to the architecture may include the waste of resources not used by the launch configuration (e.g., part of the shared memories) or average hit conflict for the shared memory banks in the case of multiple threads trying to read from and/or write to the same bank. An example related to micro-kernels may be to create a synthetic kernel that represents a small part of the program that will consume X % (e.g., 80%) of the total runtime necessary to execute the program, to run it on an SM or the like using the launch configurations that are candidates for ranking, and to gather the performance of the kernel expressing it in number of instructions per clock cycle to determine where the optimal point is (point of diminished return). The rationale for discovering the optimal point, for example, is that above a specific threshold, adding more threads to the SMs may not help further because the time spent in managing the threads will start to interfere with the hardware ability of scheduling them on the available resources at cause of quantity of conflict, competition and concurrency among threads. After ranking, one or more of the ranked launch configurations may be implemented to execute the code. For instance, the top 1 or a number of launch configurations may be tried. In this way, optimal launch configurations can be used even without a programmer or user or the like having to know details of the underlining target hardware architecture.

Figure 2:
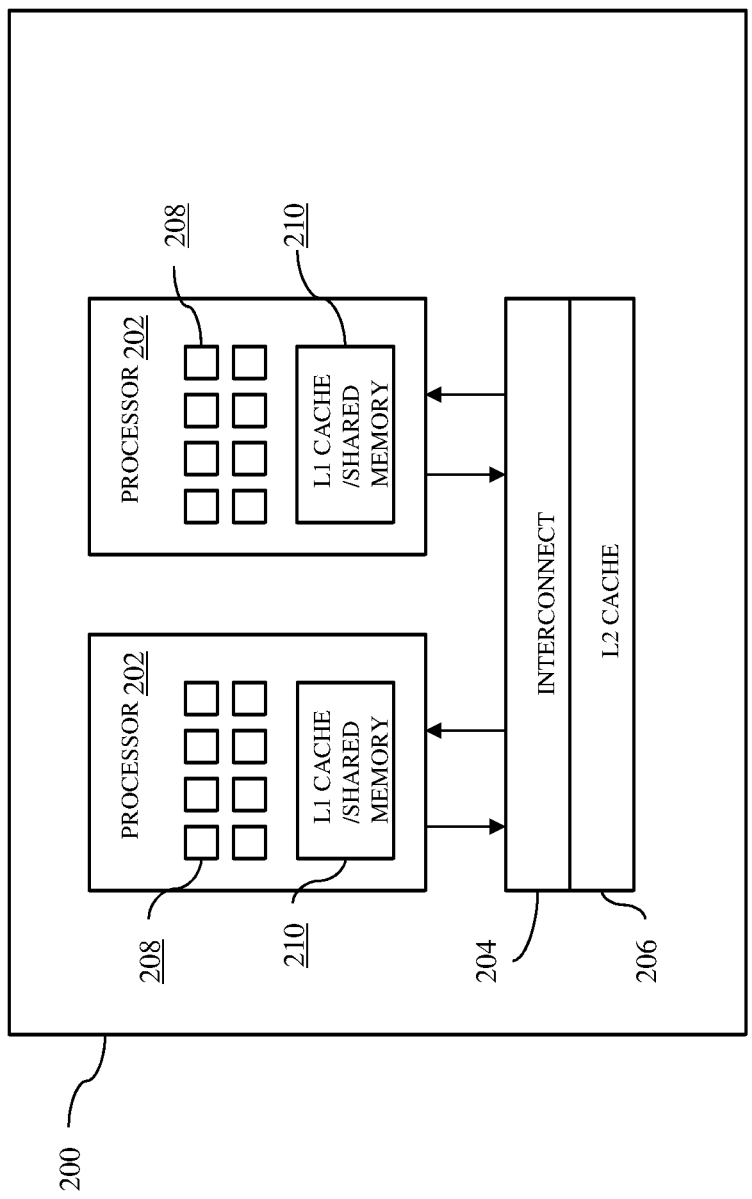
FIG. 2 is a diagram illustrating an overview of a schematic of an example hardware acceleration device in one embodiment.

FIG. 2 is a diagram illustrating a general schematic view of example GPU architecture in one embodiment as an example accelerator. Components of GPU are parametric. In existing architectures the quantity of details and relationship between hardware components is difficult to manage. The methodology of the present disclosure in some embodiments, given parametric models and the rules that explain how the different hardware components interact, generates the possibilities (which may be over the billions), discards those that are impossible, and ranks those that are possible using different penalty weights. A GPU 200 may include multiple processors 202, each of which may have multiple cores. The processors 202 are coupled to memory such as a L2 cache 206 via an interconnect 204. Each of the processors 202 may further include multiple cores 208 and memory such as L1 cache 210, shared memory, and other components. Blocks are allocated and run on one or more of the multiple processors 202 of the GPU 200.

In some embodiments, a set of inequalities (or constraints) are provided which may or may not be satisfied, for example, in hard or soft ways. If a launch configuration does not satisfy any one of the hard inequalities, then the launch configuration is not considered possible. On the other hand, even if a launch configuration does not satisfy a soft inequality, the launch configuration is considered possible, but may be penalized by a penalty weight, for instance, since a launch configuration that does not satisfy all the soft inequalities may function but in a sub-optimal manner.

For example, the fact that one cannot assign 1 block of X threads each one with Y registers to 1 SM if X*Y is greater the number of registers available in a SM is a hard inequality because that launch configuration will never be executed by the GPU. On the other hand, if it is discovered that one can assign 2 blocks to 1 SM and that each block can have from a minimum of 4 to a maximum of 8 warps, the methodology of the present disclosure using micro-kernels can determine that the optimal point or spot for thread management overhead is 6 warps and may generate launch configurations also with 7 and 8 warps per block, assigning to them a penalty considering the diminished return in number of instructions executed per clock cycle using, for example, the difference in the average number of instructions executed per clock cycle as the number of warps used increases from 4 to 8 (e.g., the average number of instructions executed per clock cycle for 4, 5, 6, 7 and 8 warps by the 2 blocks could be 3, 10, 20, 22 and 23 showing that using more than 6 warps increases the average number of instructions executed per clock cycle but not as much as increasing the number of warps from 4 to 6). In general, the launch configurations are created to minimize the hardware overhead due to thread management. In one aspect, minimizing the hardware overhead in thread management considers optimizing the total run time of the applications, among others. While the above examples were illustrated with a GPU as an example accelerator, the methodology of the present disclosure may also apply to other architectures such as FPGAs and tensor processing units (TPUs) and GraphCores.

In some embodiment, launch configurations can be generated, and code run on an accelerator to observe whether the accelerator would run or not under the conditions of each launch configuration, and the efficiencies of those runs. Differences between launch configurations can be checked, for example, to discover that it is not possible to assign more than N blocks per SM, regardless of whether there are plenty of resources unused in the SM. For instance, the methodology of the present disclosure in some embodiments can start to learn (e.g., as a self-reinforcement system with a feedback loop) and update the constraints, for example, using statistical techniques, machine learning and/or mathematical inference rules. The constraints can comprise a domain knowledge base that can grow, and the methodology of the present disclosure can autonomously improve over time as discovers more constraints that can be integrated.

In some embodiments, the methodology can include saving the results of the experimental runs of the micro-kernels. The next time a micro-kernel needs to be run, the methodology may include checking whether the micro-kernel is similar to a micro-kernel that was run in the past. Similarity can be determined based on machine learning clustering techniques or other techniques. Based on the degree of similarity, it may be decided whether to run the new micro-kernel or use the results in terms of thread management overhead obtained from running the previously run micro-kernel. For example, if a similarity score between the new micro-kernel and the past run micro-kernel satisfies a similarity threshold, and for example, if the variability in the results obtained running the past run micro-kernel satisfies a variability threshold (e.g., small variability), then the results from the past run micro-kernel may be used. Small variability, for example, would provide a high level of confidence that the results obtained running the past run micro-kernel is almost the same as those obtained from running the new micro-kernel.

In one aspect, the methodology determines which configuration is better in terms of hardware threads management overhead, for example: 1) considering a mapping of registers and other hardware resources to threads, of threads to blocks and blocks to processors (e.g., as described above with respect to the example illustrating that 33 threads per block was not a good choice if the GPU processors had each 2 groups of 16 CUDA core functional units and the 33 threads had to be executed on such groups); and 2) calculating the number of instructions per clock cycle executed by the processors, running micro-kernels. For instance, at each clock cycle, the number of available warps in each processor will determine the hardware overhead related to their management as a function of the mapping executed, the hardware features of the architecture, its behaviors, the threads' instruction mixes, the dependencies among instructions and the threads' communications. After a "good" mapping of hardware resources to threads, threads to blocks, and blocks to processors (which can be accomplished in a parametric way given that abstract models of the underling hardware are correctly developed), running micro-kernels allows for quantifying non-linear phenomena related to thread management. For instance, the hardware of each processor, at each clock cycle, checks which warps can be executed, which cannot, and of the ones that can be executed which resources they require and if such resources are available at that time. The hardware checks require different quantities of time, and therefore imply different thread management overheads, for different combinations of hardware resources assigned to threads, threads per block, blocks per processor, dependencies among instructions, threads' instruction mixes and threads' communications. The metric used to measure overhead can be local ones, per processor, for example, the average number of instructions executed per clock cycle by a processor. Others may involve the guarantee that warps executions will not be slowed down at cause of threads' communications and may involve the execution of micro-kernels to verify how the number of instructions executed per second changes increasing the number of threads per processor, the threads' instruction mixes and the dependencies among instructions.

Figure 3:
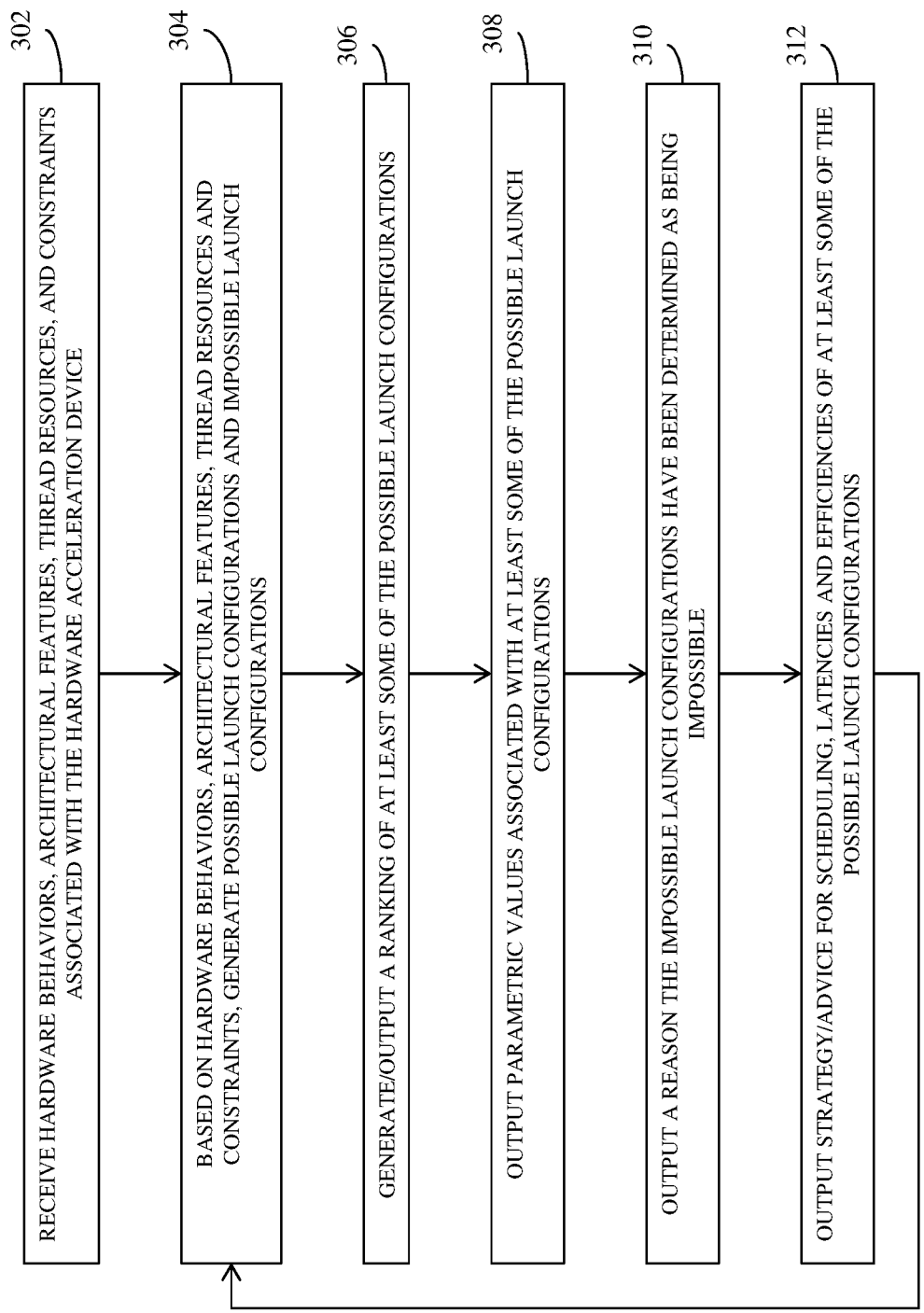
FIG. 3 is a flow diagram illustrating a computer-implemented method in one embodiment, of determining launch configurations of a hardware acceleration device which minimize hardware thread management overhead in running a program code.

FIG. 3 is a flow diagram illustrating a computer-implemented method, in one embodiment, of determining launch configurations of a hardware acceleration device which minimize hardware thread management overhead in running a program code. A hardware acceleration device is also referred to as a hardware accelerator. At 302, input may be received, the input may include hardware behaviors associated with the hardware acceleration device, architectural features associated with the hardware acceleration device, thread resources associated with the hardware acceleration device, constraints associated with the hardware acceleration device. The constraints may include hard constraints which if not satisfied, the hardware acceleration device would not run, and soft constraints which even if not satisfied, the hardware acceleration device would run.

At 304, based on the hardware behaviors, the architectural features, the thread resources and the constraints, generating possible launch configurations and impossible launch configurations, the impossible launch configurations comprising launch configurations not satisfying the hard constraints, and the possible configurations comprising launch configurations satisfying the hard constraints. In one aspect, all launch configurations associated with the hardware acceleration device may be generated or derived based on computing combinatorics of at least some of the input, for instance, all arrangements of configurations of hardware accelerator device's components subject to the given input. The possible launch configurations and impossible launch configurations are determined from the generated launch configurations. For instance, the possible launch configurations and impossible launch configurations are subsets of said all launch configurations.

At 306, a ranking of at least some of the possible launch configurations based on how well each of said at least some of the possible launch configurations satisfies the soft constraints may be generated and output. Each of, or one or more of, the soft constraints may have an associated penalty weight, based on which degrees of how well the soft constraints are satisfied, are determined. For example, for each constraint, the apparatus (and/or method) may determine the degree of how well that constraint is satisfied, for instance, based on the respective associated penalty weight. In one aspect, at least one micro-kernel with each of the possible launch configurations may be run, to determine how well said each of the possible launch configurations satisfies the soft constraints. In one aspect, at least one micro-kernel with each of the possible launch configurations may be run to determine an optimal launch configuration providing an optimal point associated with thread management.

At 308, parametric values of at least some of the possible launch configurations are output. Examples of the parametric values may include one or more of, but not limited to, a configuration of the 2-dimensional (2D) grid of blocks, a number of threads per block and associated 3-dimensional (3D) configuration, a number of registers to assign to each thread, a number of blocks to assign to each processor of the hardware acceleration device (also referred to as a hardware accelerator), a quantity of a processor's shared memory assigned to a block, or a quantity of read-only constant memory used, or combinations thereof.

At 310, an explanation of why the impossible launch configurations have been determined as being impossible is output. For instance, one or more hard constraints not satisfied may be provided.

At 312, a strategy for scheduling, latencies and efficiencies associated with the hardware acceleration device is output. In one aspect, the strategy for scheduling, latencies and efficiencies may be fed back as part of the constraints. In turn the added constraints are further used in generating the possible launch configurations and impossible launch configurations.

One or more of the possible launch configurations may be used in running the program code on the hardware acceleration device. For instance, the hardware acceleration device executes the program code based on at least one of the ranked possible launch configurations.

Figure 4:
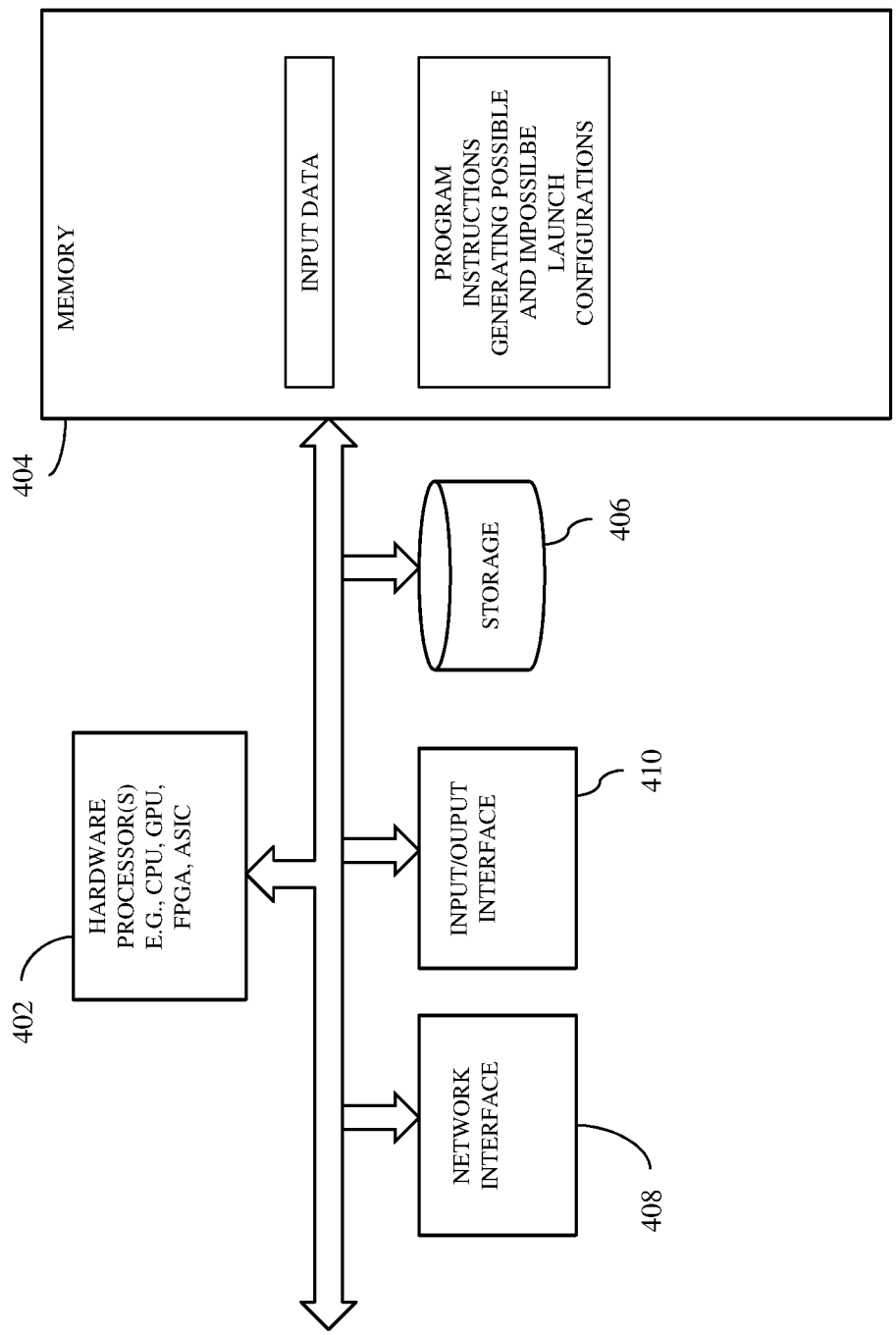
FIG. 4 is a diagram showing components of a system or apparatus in one embodiment that determines launch configurations of a hardware acceleration device which minimize hardware thread management overhead in running a program code.

FIG. 4 is a diagram showing components of a system or apparatus in one embodiment that determines launch configurations of a hardware acceleration device which minimize hardware thread management overhead in running a program code. One or more hardware processors 402 such as a central processing unit (CPU), a graphic process unit (GPU), and/or a Field Programmable Gate Array (FPGA), an application specific integrated circuit (ASIC), and/or another processor, may be coupled with a memory device 404, and generate launch configurations. The memory device may include random access memory (RAM), read-only memory (ROM) or another memory device, and may store data and/or processor instructions for implementing various functionalities associated with the methods and/or systems described herein. One or more hardware processors 402 may execute computer instructions stored in the memory or received from another computer device or medium. The memory device 404 may, for example, store instructions and/or data for functioning of the one or more hardware processors 402, and may include an operating system and other program of instructions and/or data. One or more hardware processors 402 may receive input comprising hardware behaviors associated with a hardware acceleration device, architectural features associated with the hardware acceleration device, thread resources associated with the hardware acceleration device, constraints associated with the hardware acceleration device. In one aspect, the constraints may include hard constraints which if not satisfied, the hardware acceleration device would not run, and soft constraints which even if not satisfied, the hardware acceleration device would run.

For instance, at least one hardware processor 402 may generate possible and impossible launch configurations as described above. In one aspect, input data may be stored in a storage device 406 or received via a network interface 408 from a remote device, and may be temporarily loaded into the memory device 404 for generating possible and impossible launch configurations. The generated launch configurations may be stored on memory 404 and/or storage device 406, for example, for programming the hardware acceleration with the parametric values specified in one or more of the generate launch configurations. In another aspect, the one or more hardware processors 402 may be coupled with interface devices such as a network interface 408 for communicating with remote systems, for example, via a network, and an input/output interface 410 for communicating with input and/or output devices such as a keyboard, mouse, display, and/or others.

Figure 5:
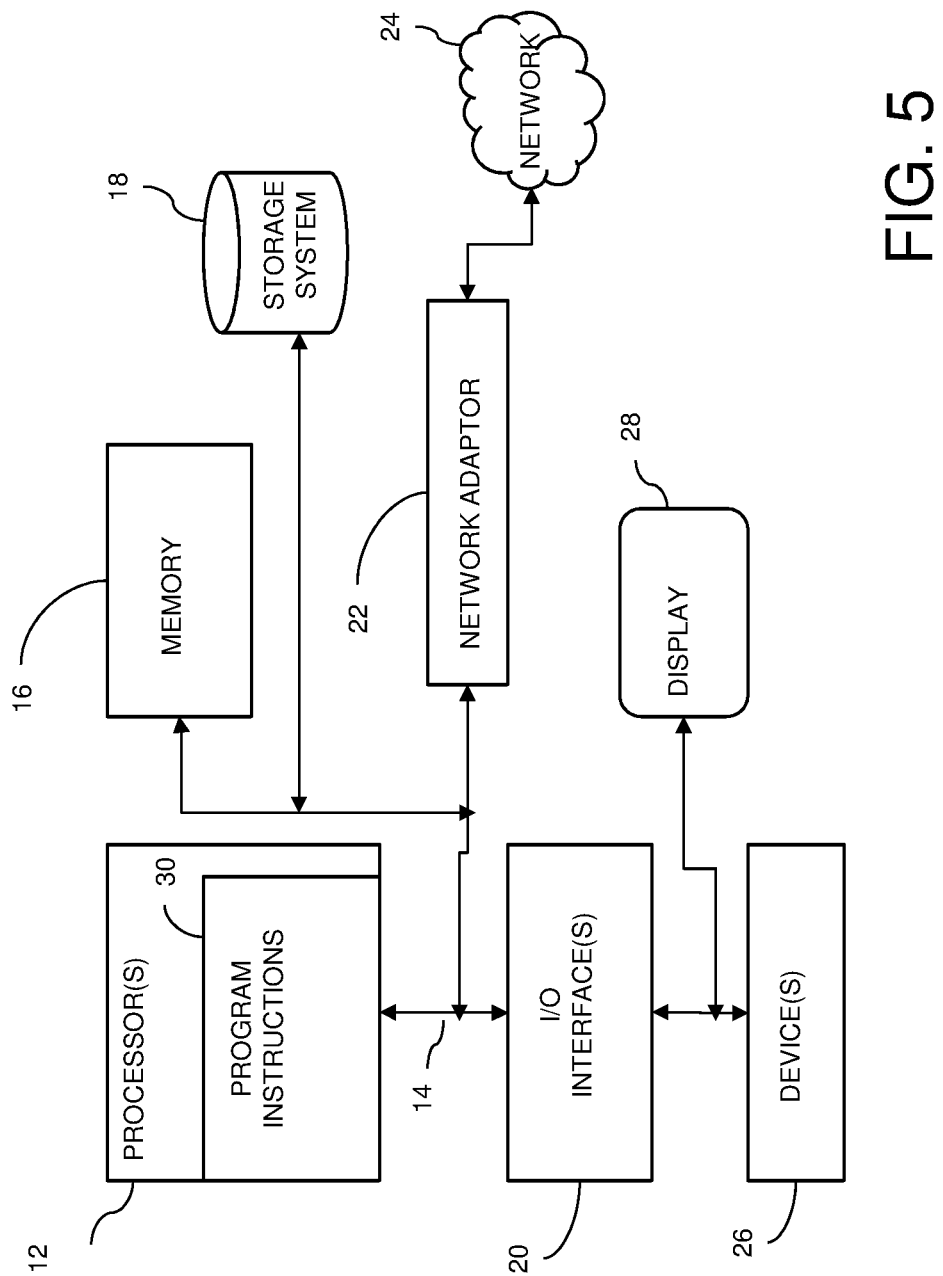
FIG. 5 illustrates a schematic of an example computer or processing system that may implement a system in one embodiment of the present disclosure.

FIG. 5 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include one or more modules 30 that perform the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of determining launch configurations of a hardware acceleration device which minimize hardware thread management overhead in running a program code, comprising:

receiving as input hardware behaviors associated with a hardware acceleration device, architectural features associated with the hardware acceleration device, thread resources associated with the hardware acceleration device, constraints associated with the hardware acceleration device, the constraints comprising hard constraints which if not satisfied, the hardware acceleration device would not run, and soft constraints which even if not satisfied, the hardware acceleration device would run;

based on the hardware behaviors, the architectural features, the thread resources and the constraints, generating possible launch configurations and impossible launch configurations associated with the hardware acceleration device in running a program code, the impossible launch configurations comprising launch configurations not satisfying the hard constraints, and the possible launch configurations comprising launch configurations satisfying the hard constraints;

outputting a ranking of at least some of the possible launch configurations based on how well each of said at least some of the possible launch configurations satisfies the soft constraints;

outputting parametric values of said at least some of the possible launch configurations, wherein the parametric values comprise one or more of a configuration of a 2-dimensional (2D) grid of processor blocks comprised of threads, at least one of the processor blocks having a scheduler, instruction dispatch unit, core, load/store unit, L1 cache and shared memory;

outputting an explanation why the impossible launch configurations have been determined as being impossible; and outputting a strategy for scheduling, latencies and efficiencies of said at least some of the possible launch configurations.

2. The method of claim 1, further comprising the hardware acceleration device executing the program code based on at least one of the ranked possible launch configurations.

3. The method of claim 1, wherein the strategy for scheduling, latencies and efficiencies is fed back as part of the constraints based on which the possible launch configurations and impossible launch configurations are generated.

4. The method of claim 1, further comprising generating all launch configurations associated with the hardware acceleration device based on combinatorics of at least some of the input, wherein the possible launch configurations and impossible launch configurations are subsets of said all launch configurations.

5. The method of claim 1, further comprising running at least one micro-kernel with each of the possible launch configurations, to determine how well said each the possible launch configurations satisfies the soft constraints.

6. The method of claim 1, further comprising running at least one micro-kernel with each of the possible launch configurations to determine an optimal launch configuration providing an optimal point associated with thread management.

7. The method of claim 1, wherein each of the soft constraints has an associated penalty weight, based on which a degree of how well a respective software constraint is satisfied is determined.

8. The method of claim 1, wherein the parametric values further comprise at least one of: a number of threads per block and associated 3-dimensional (3D) configuration, a number of registers to assign to each thread, a number of blocks to assign to each processor of the hardware acceleration device, a quantity of a processor's shared memory assigned to a block, and a quantity of read-only constant memory used.

9. An apparatus comprising: a hardware processor; a memory couple with the hardware processor, the hardware processor operable to at least:

receive as input hardware behaviors associated with a hardware acceleration device, architectural features associated with the hardware acceleration device, thread resources associated with the hardware acceleration device, constraints associated with the hardware acceleration device, the constraints comprising hard constraints which if not satisfied, the hardware acceleration device would not run, and soft constraints which even if not satisfied, the hardware acceleration device would run;

based on the hardware behaviors, the architectural features, the thread resources and the constraints, generate possible launch configurations and impossible launch configurations associated with the hardware acceleration device in running a program code, the impossible launch configurations comprising launch configurations not satisfying the hard constraints, and the possible launch configurations comprising launch configurations satisfying the hard constraints;

output a ranking of at least some of the possible launch configurations based on how well each of said at least some of the possible launch configurations satisfies the soft constraints;

output parametric values of said at least some of the possible launch configurations, wherein the parametric values comprise one or more of a configuration of a 2-dimensional (2D) grid of processor blocks comprised of threads, at least one of the processor blocks having a scheduler, instruction dispatch unit, core, load/store unit, L1 cache and shared memory;

output an explanation why the impossible launch configurations have been determined as being impossible; and output a strategy for scheduling, latencies and efficiencies of said at least some of the possible launch configurations.

10. The apparatus of claim 9, wherein the hardware acceleration device executes the program code based on at least one of the ranked possible launch configurations.

11. The apparatus of claim 9, wherein the strategy for scheduling, latencies and efficiencies is fed back as part of the constraints based on which the possible launch configurations and impossible launch configurations are generated.

12. The apparatus of claim 9, wherein the hardware processor generates all launch configurations associated with the hardware acceleration device based on combinatorics of at least some of the input, wherein the possible launch configurations and impossible launch configurations are subsets of said all launch configurations.

13. The apparatus of claim 9, wherein at least one micro-kernel is run on the hardware acceleration device with each of the possible launch configurations, to determine how well said each of the possible launch configurations satisfies the soft constraints.

14. The apparatus of claim 9, wherein at least one micro-kernel is run on the hardware acceleration device with each of the possible launch configurations to determine an optimal launch configuration providing an optimal point associated with thread management on the hardware acceleration device.

15. The apparatus of claim 9, wherein each of the soft constraints has an associated penalty weight, based on which a degree of how well a respective software constraint is satisfied is determined.

16. A computer readable storage medium storing a program of instructions executable by a machine to perform a method of determining launch configurations of a hardware acceleration device which minimize hardware thread management overhead in running a program code, comprising:

receiving as input hardware behaviors associated with the hardware acceleration device, architectural features associated with the hardware acceleration device, thread resources associated with the hardware acceleration device, constraints associated with the hardware acceleration device, the constraints comprising hard constraints which if not satisfied, the hardware acceleration device would not run, and soft constraints which even if not satisfied, the hardware acceleration device would run;

based on the hardware behaviors, the architectural features, the thread resources and the constraints, generating possible launch configurations and impossible launch configurations, the impossible launch configurations comprising launch configurations not satisfying the hard constraints, and the possible launch configurations comprising launch configurations satisfying the hard constraints;

outputting a ranking of at least some of the possible launch configurations based on how well each of said at least some of the possible launch configurations satisfies the soft constraints;

outputting parametric values of said at least some of the possible launch configurations^ wherein the parametric values comprise one or more of a configuration of a 2-dimensional (2D) grid of processor blocks comprised of threads, at least one of the processor blocks having a scheduler, instruction dispatch unit, core, load/store unit, L1 cache and shared memory;

outputting an explanation why the impossible launch configurations have been determined as being impossible; and outputting a strategy for scheduling, latencies and efficiencies of said at least some of the possible launch configurations.

17. The computer readable storage medium of claim 16, further comprising the hardware acceleration device executing the program code based on at least one of the ranked possible launch configurations.

18. The computer readable storage medium of claim 16, wherein the strategy for scheduling, latencies and efficiencies is fed back as part of the constraints based on which the possible launch configurations and impossible launch configurations are generated.

19. The computer readable storage medium of claim 16, further comprising generating all launch configurations associated with the hardware acceleration device based on combinatorics of at least some of the input, wherein the possible launch configurations and impossible launch configurations are subsets of said all launch configurations.

20. The computer readable storage medium of claim 16, further comprising running at least one micro-kernel with each of the possible launch configurations, to determine how well said each of the possible launch configurations satisfies the soft constraints.

* * * * *